(12) United States Patent
Garimella et al.

(10) Patent No.: US 10,001,042 B2
(45) Date of Patent: Jun. 19, 2018

(54) SYSTEMS, METHODS, AND APPARATUS FOR REDUCTANT DOSING IN AN SCR AFTERTREATMENT SYSTEM

(71) Applicant: Cummins Inc., Columbus, IN (US)

(72) Inventors: Phanindra V. Garimella, Bloomington, IN (US); Andrew W. Osburn, Nashville, IN (US)

(73) Assignee: Cummins Inc., Columbus, IN (US)

( * ) Notice: Subject to any disclaimer, the term of this patent is extended or adjusted under 35 U.S.C. 154(b) by 116 days.

(21) Appl. No.: 14/589,339

(22) Filed: Jan. 5, 2015

(65) Prior Publication Data
US 2015/0247435 A1    Sep. 3, 2015

Related U.S. Application Data (60) Provisional application No. 61/947,127, filed on Mar. 3, 2014.

(51) Int. Cl.
F01N 3/20    (2006.01)

(52) U.S. Cl.
CPC ........ *F01N 3/208* (2013.01); *F01N 2560/021* (2013.01); *F01N 2560/026* (2013.01); *F01N 2560/14* (2013.01); *F01N 2610/02* (2013.01); *F01N 2900/0404* (2013.01); *F01N 2900/0601* (2013.01); *F01N 2900/1602* (2013.01); *F01N 2900/1616* (2013.01); *F01N 2900/1621* (2013.01); *F01N 2900/1622* (2013.01); *Y02T 10/24* (2013.01)

(58) Field of Classification Search
CPC ......... F01N 2560/021; F01N 2560/026; F01N 2560/14; F01N 2610/02; F01N 2900/0404; F01N 2900/0601; F01N 2900/1602; F01N 2900/1616; F01N 2900/1621; F01N 2900/1622; Y02T 10/24
See application file for complete search history.

(56) References Cited

U.S. PATENT DOCUMENTS

| | | | |
|---|---|---|---|
| 5,555,725 A | 9/1996 | Shimasaki et al. | |
| 5,645,745 A | 7/1997 | Hartwick et al. | |
| 5,746,053 A | 5/1998 | Hibino | |
| 6,904,751 B2 | 6/2005 | Makki et al. | |

(Continued)

FOREIGN PATENT DOCUMENTS

| | | |
|---|---|---|
| WO | 2007084690 A2 | 7/2007 |
| WO | 2008009940 A2 | 1/2008 |

(Continued)

*Primary Examiner* — Brandon Lee
(74) *Attorney, Agent, or Firm* — Taft Stettinius & Hollister LLP (57) ABSTRACT

Systems, methods and apparatus disclosed that include an internal combustion engine and an exhaust system that includes an exhaust aftertreatment system with an SCR catalyst. A $NO_x$ sensor downstream of the SCR catalyst is provided along with techniques for estimating an amount of $NO_x$ and NH3 at the tailpipe to decouple the impact of cross-sensitivity of the $NO_x$ sensor to $NO_x$ and NH3. Feedback control of the reductant dosing amount based on these estimates is also provided.

18 Claims, 8 Drawing Sheets

(56) References Cited

U.S. PATENT DOCUMENTS

| | | |
|---|---|---|
| 7,178,328 B2 | 2/2007 | Solbrig |
| 7,426,825 B2 | 9/2008 | Viola et al. |
| 7,610,750 B2 | 11/2009 | Viola et al. |
| 7,610,759 B2 | 11/2009 | Yoshida et al. |
| 7,613,561 B1 | 11/2009 | Stewart et al. |
| 7,810,313 B2 | 10/2010 | Stewart et al. |
| 2008/0223019 A1* | 9/2008 | Gonze .................. F01N 3/2013 60/286 |
| 2008/0250774 A1 | 10/2008 | Solbrig |
| 2009/0031710 A1 | 2/2009 | Wei et al. |
| 2009/0185954 A1* | 7/2009 | Qi .......................... F01N 3/208 422/62 |
| 2010/0024390 A1 | 2/2010 | Wills et al. |
| 2010/0068147 A1 | 3/2010 | Hibberd et al. |
| 2010/0101215 A1* | 4/2010 | Wu ........................ F01N 3/208 60/286 |
| 2010/0122520 A1 | 5/2010 | Han |
| 2010/0242440 A1 | 9/2010 | Garimella et al. |
| 2011/0185707 A1* | 8/2011 | Upadhyay ................ F01N 3/18 60/274 |
| 2012/0085082 A1* | 4/2012 | Levijoki ................ F01N 3/208 60/274 |

FOREIGN PATENT DOCUMENTS

| | | |
|---|---|---|
| WO | 2009036780 A1 | 3/2009 |
| WO | 2009089936 A1 | 7/2009 |
| WO | 2011034798 A1 | 3/2011 |
| WO | 2011034805 A1 | 3/2011 |
| WO | 2011034807 A2 | 3/2011 |

* cited by examiner

SYSTEMS, METHODS, AND APPARATUS FOR REDUCTANT DOSING IN AN SCR AFTERTREATMENT SYSTEM

CROSS-REFERENCE TO RELATED APPLICATION

The present application claims the benefit of the filing date of Provisional App. No. 61/947,127 filed on Mar. 3, 2014, which is incorporated herein by reference in its entirety.

BACKGROUND

The present disclosure generally relates to exhaust aftertreatment systems for internal combustion engines, and more particularly to exhaust aftertreatment systems that include an SCR catalyst and a reductant dosing system. Presently known exhaust aftertreatment systems for engines operate under several system variations that impact $NO_x$ conversion efficiency of the SCR catalyst since a feedforward reductant dosing command based on engine out $NO_x$, exhaust aftertreatment system temperature (such as catalyst bed temperature), and space velocity is not able to account for these variations. A $NO_x$ sensor at the tailpipe provides an opportunity for feedback control of the reductant dosing amount to achieve the desired $NO_x$ conversion efficiency. However, $NO_x$ sensors also suffer from drawbacks, including cross-sensitivity to both $NO_x$ and $NH_3$, which may lead to a positive feedback loop and unstable system behavior. Therefore, further technological developments are desirable in this area.

SUMMARY

Unique systems, methods, and apparatus relating to reductant dosing control in an exhaust aftertreatment system that includes an SCR catalyst are disclosed. A $NO_x$ sensor downstream of the SCR catalyst is provided along with techniques for estimating an amount of $NO_x$ and $NH_3$ at the tailpipe to decouple the impact of cross-sensitivity of the $NO_x$ sensor to $NO_x$ and $NH_3$. Feedback control of the reductant dosing amount based on these estimates is also provided.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
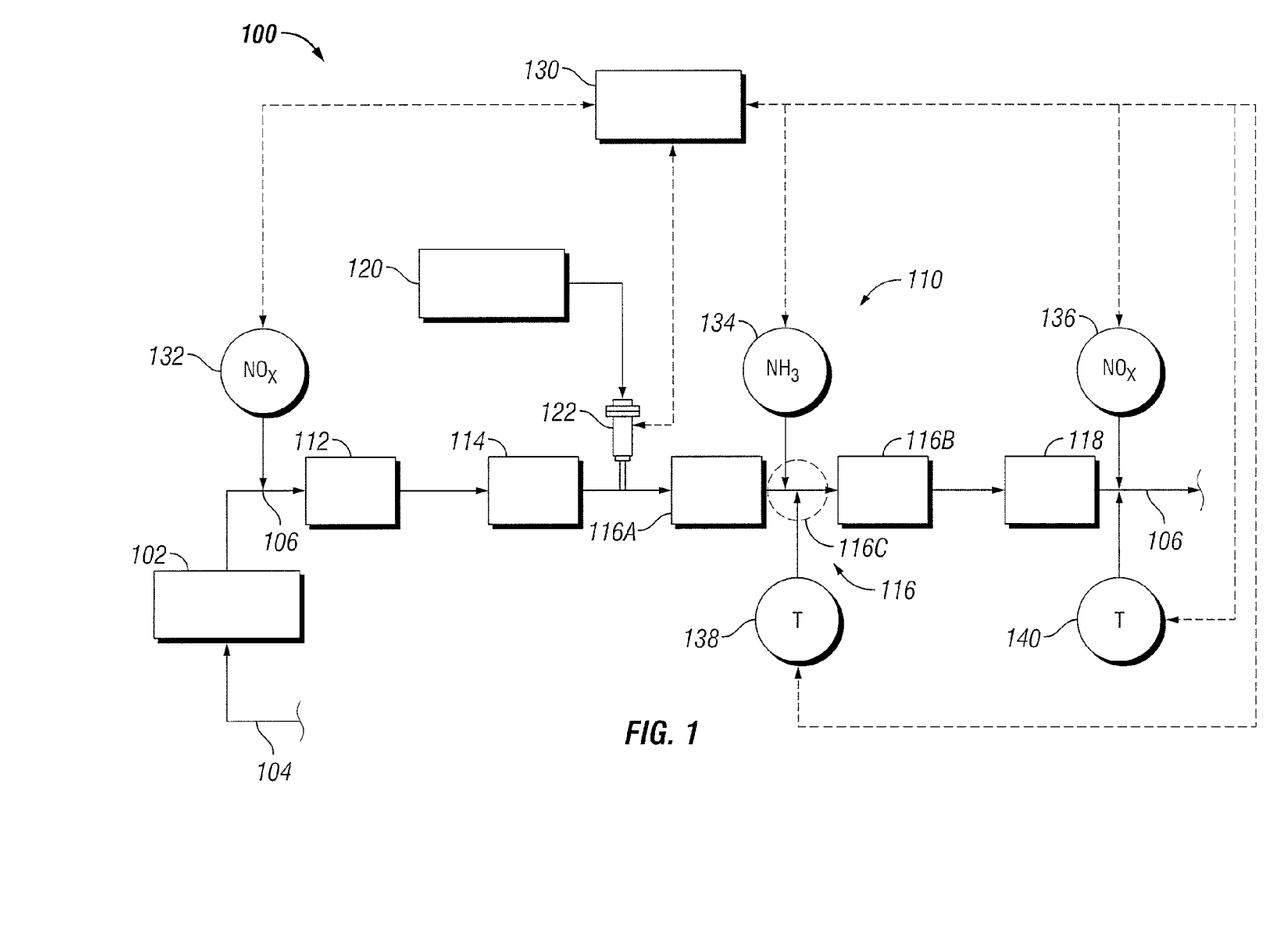
FIG. 1 is a schematic of an exemplary internal combustion engine system that includes reductant dosing into an exhaust aftertreatment system.

With reference to FIG. 1, an exemplary system 100 for control of an exhaust aftertreatment system 110 is shown. The exemplary system 100 may be provided on a vehicle powered by an engine 102, such as a diesel engine, or on an engine 102 utilized in other applications such as power generation or pumping systems. The engine 102 may be any type of engine understood in the art, including a diesel, gasoline, turbine, etc., that produces $NO_x$ gases during operation. Engine 102 includes an intake conduit 104 through which charge air enters and an exhaust conduit 106 through which exhaust gas resulting from combustion exits to the atmosphere. Before entering the atmosphere, however, the exhaust gas is treated by one or more aftertreatment devices in the exhaust aftertreatment system 110.

The exhaust conduit 106 is fluidly coupled to the exhaust aftertreatment system 110. The exhaust aftertreatment system includes one or more selective catalytic reduction (SCR) catalysts 116. The SCR catalyst 116 includes a first or upstream catalyst bed 116A (toward the engine) and a second or downstream catalyst bed 116B (away from the engine), which form an SCR catalyst mid-bed 116C. In certain embodiments, the SCR catalyst 116 may be a single catalyst brick or separate catalyst bricks.

In the illustrated embodiment, the exhaust aftertreatment system 110 also includes one or more diesel oxidation catalysts (DOC) 112 and one or more diesel particulate filters (DPF) 114 upstream of the SCR catalyst 116, and one or more ammonia oxidation catalysts (AMOX) 118 downstream of the SCR catalyst 116. Aftertreatment systems with only an SCR catalyst 116 are also contemplated. In certain embodiments, one or more of the exhaust aftertreatment system 110 components may not be present, may be located in different locations than what is shown in FIG. 1, may be provided at multiple locations, and/or may be commingled. Further, any of these components may be catalyzed or not catalyzed, may be arranged in alternate order, and/or may be provided in the same or separate housings.

The system 100 further includes a reductant injector (doser) 122 operationally coupled to the exhaust conduit 106 at a position upstream of the SCR catalyst 116 with an outlet arranged to spray a reductant into the exhaust conduit 106 where it mixes with engine exhaust gas produced by the engine 102. The SCR catalyst 116 promotes a chemical reaction between the reductant and $NO_x$ in the exhaust gas that converts substantial amounts of $NO_x$ to reduce $NO_x$ emissions before the exhaust gas passes into the atmosphere. As used herein, injector includes any nozzle, static device, electronically controllable device, and/or mechanical actuator that provides an outlet for reductant delivery. The reductant injector 122 is fluidly coupled to a reductant source 120. In certain embodiments, the reductant source 120 may include a storage tank, or housing, for storing a liquid reductant or a dry reductant in a solid storage media that is released in gaseous form when heated. The reductant may be any type of reductant utilized in an aftertreatment system for engine exhaust that results in ammonia being utilized as the final reductant—including at least ammonia (gaseous or aqueous) and urea. Certain operations described herein apply to $NO_x$ reduction generally and are not specific to SCR systems. Where the $NO_x$ reduction operations are not specific to SCR systems, hydrocarbon or other reductant(s) may be utilized.

Various sensors may be positioned throughout the system 100 to provide signals indicating certain system 100 conditions, such as level, temperature, and pressure signals, for example. The sensors may be of any type understood in the art. The illustrated sensors include a first or engine-out $NO_x$ sensor 132 operationally coupled to the exhaust conduit 106 at a position upstream of the exhaust aftertreatment system 110, and a second or system out $NO_x$ sensor 136 operationally coupled to the exhaust conduit 106 at a position downstream of the SCR catalyst 116. The first $NO_x$ sensor 132 provides an engine output $NO_x$ amount or level. The first $NO_x$ sensor 132 may be positioned anywhere in the exhaust stream that is upstream of the SCR catalyst 116 and downstream of the internal combustion engine 102 to provide the engine output $NO_x$ amount. The second $NO_x$ sensor 136 provides a system output $NO_x$ amount or level. The system 100 further includes an $NH_3$ sensor 134 operationally coupled to the exhaust conduit 106 and positioned at the mid-bed of the SCR catalyst, operable to provide an $NH_3$ amount or level.

The system 100 also includes the capability to determine one or more temperatures of the SCR catalyst 116 and exhaust gas in the exhaust conduit 106. The illustrated temperature sensors include an first temperature sensor 138 positioned in the SCR catalyst mid-bed 116C to provide a signal indicating the reductant temperature in the SCR catalyst mid-bed 116C and a second temperature sensor 144 positioned downstream of the SCR catalyst 116 to provide a signal indicating the exhaust gas temperature downstream of the SCR catalyst 116. Certain embodiments may include additional and/or alternative temperature sensors and/or temperature models. The temperature sensor 138 is illustrated at a mid-bed location of the SCR catalyst 116 in FIG. 1. The temperature sensor 138 and/or other temperature sensors may be additionally and/or alternatively located upstream and/or downstream of the SCR catalyst 116 and/or at other locations along SCR catalyst 116. In addition, the outputs from two or more sensors may be averaged or otherwise modeled to provide a temperature value for a location along SCR catalyst 116.

The first $NO_x$ sensor 132, the $NH_3$ sensor 134, the second $NO_x$ sensor 136, and the first and second temperature sensors 138, 140 need not be in direct communication with exhaust conduit 106, and can be located at any position within exhaust conduit 106 that provides a suitable indication of applicable exhaust conduit 106 readings. The illustrated sensors are exemplary only, and may be re-positioned, removed, substituted, and other sensors may be present that are not illustrated in FIG. 1. Further, certain sensors may instead be virtual sensors that are calculated from other parameters available to the system 100, or values that would be indicated by sensors may instead be supplied to a computer readable memory location, via a datalink or network communication, or otherwise be made available to the system 100 where the sensor providing the sensed parameter is not a part of the defined system.

The system 100 may further include hardware that is not illustrated in FIG. 1, but that is nevertheless contemplated herein. For example, the exhaust aftertreatment system 110 may include one or more other aftertreatment components not shown, such as various temperature, pressure and exhaust gas constituent sensors. In another example, the exhaust conduit 106 may include various components not shown, such an exhaust gas recirculation (EGR) system, a turbocharger system, coolers, and other components connecting exhaust conduit 106 to intake conduit 104. The addition and/or substitution of one or more of the described hardware is well known in the art, and such hardware is not described further except where specific operations or procedures herein utilize such hardware.

The system further includes a controller 130 having a number of modules structured to functionally execute operations for controlling an exhaust aftertreatment system. In certain embodiments, the controller 130 forms a portion of a processing subsystem including one or more computing devices having memory, processing, and communication hardware. The controller 130 may be a single device or a distributed device, and the functions of the controller 130 may be performed by hardware or software. The controller 130 may be in communication with any sensor, actuator, or component of the system 100 to perform the operations described herein. For example, in FIG. 1 the controller 130 is in communication with the illustrated sensors 132, 134, 136, 138, 140 and the reductant injector 122. Communication may be direct, electronic, hard-wired, wireless, over a network, and/or over a datalink. The controller 130 may be a part of or in communication with an engine controller (not shown), commonly referred to as an engine control unit (ECU) or engine control module (ECM), and the controller 130 may determine engine operating parameters from the engine controller.

Figure 2:
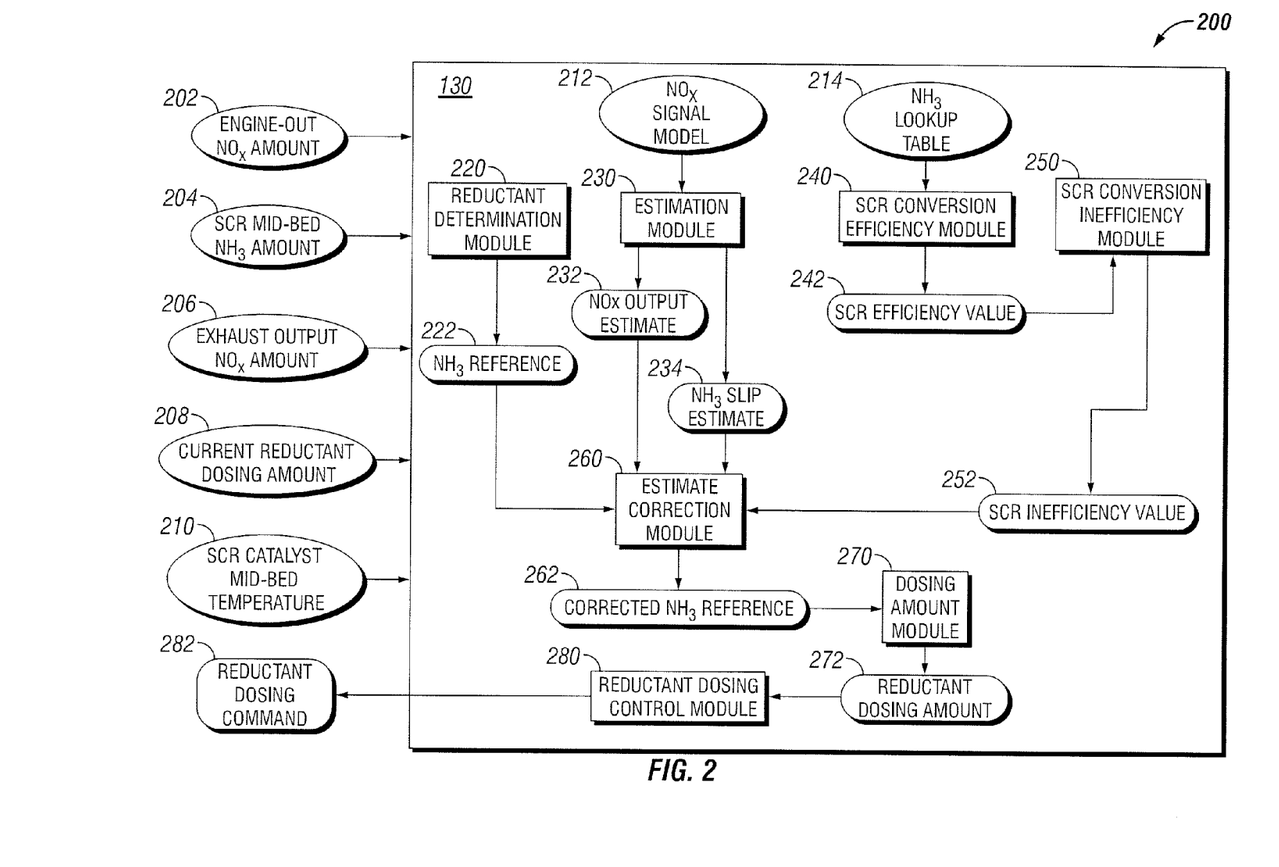
FIG. 2 is schematic of an exemplary controller that executes operations for reductant dosing into the exhaust aftertreatment system of FIG. 1.

One exemplary embodiment of the controller 130 is shown in FIG. 2. In certain embodiments, the controller 130 includes an engine-out $NO_x$ amount input 202, an SCR mid-bed $NH_3$ amount input 204, an exhaust output $NO_x$ amount input 206 from downstream of the SCR catalyst 116, a current reductant dosing amount input 208, and an SCR catalyst mid-bed temperature input 210. It should be appreciated that any and/or all of the controller inputs may be measured and/or calculated, and that other inputs are not precluded.

In certain embodiments the controller 130 includes a reductant determination module 220, an estimation module 230, an SCR conversion efficiency module 240, and an SCR conversion inefficiency module 250, an estimate correction module 260, a dosing amount module 270, and a reductant dosing control module 280. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or on non-transitory computer readable medium, and modules may be distributed across various hardware components. Certain embodiments of the controller 130 may not utilize all of the modules or reference all of the data illustrated in FIG. 2.

Certain operations herein are described as interpreting one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transitory computer readable medium, receiving the value as a run-time parameter by any means known in the art, and/or by receiving a value by which the interpreted parameter can be calculated, and/or by referencing a default value that is interpreted to be the parameter value.

The $NH_3$ determination module 220 is configured to determine an $NH_3$ reference 222 representing a target amount of $NH_3$ at the mid-bed of the SCR catalyst, which may be based, at least in part, on one or more of the controller 130 inputs such as the SCR mid-bed $NH_3$ amount 204. In certain embodiments, the $NH_3$ reference 222 may be determined based on current operating parameters of the system 100. The $NH_3$ reference 222 may be described in any terms understood in the art, including without limitation a mass of $NH_3$ over a specified time, a concentration of $NH_3$ by mass or volume, or an amount of $NH_3$ relative to an amount of $NO_x$ present in the exhaust conduit 106 (an $NH_3$ to $NO_x$ ratio, ANR). Where the $NH_3$ reference 222 is determined in response to a $NO_x$ amount, the $NO_x$ amount may be determined according to NO, $NO_2$, or $NO_x$.

The estimation module 230 is configured to determine a $NO_x$ output estimate 232 and an $NH_3$ slip estimate 234 based on the engine-out $NO_x$ amount input 202, the exhaust output $NO_x$ amount input 206, and a $NO_x$ signal model 212. In certain embodiments, the $NO_x$ signal model 212 is based on the excitation levels, such as the bandwidth or dynamics of the sensor response, of the output signals that indicate the engine-out $NO_x$ amount input 202 and the exhaust output $NO_x$ amount input 206. The excitation level of second $NO_x$ sensor 136 in response to the $NH_3$ amount is much slower than the excitation level in response to the $NO_x$ amount. As a result, a ratio of the excitation levels of first $NO_x$ sensor 132 and second $NO_x$ sensor 136 can be used to determine an efficiency and/or inefficiency of SCR catalyst 116, as discussed further below, which can then be used to determine the $NO_x$ output estimate 232 and $NH_3$ slip estimate 234.

The SCR conversion efficiency module 240 is configured to determine an SCR efficiency value 242. In certain embodiments, the SCR efficiency value 242 may be determined from an $NH_3$ lookup table 214 based on the SCR catalyst mid-bed temperature 210. In other embodiments, the SCR efficiency value 242 may be determined by a formula of 1 less the ratio of exhaust output $NO_x$ amount input 206 to the engine-out $NO_x$ amount input 202.

The SCR conversion inefficiency module 250 is configured to determine an SCR inefficiency value 252 based on the ratio of exhaust output $NO_x$ amount 206 to the engine-out $NO_x$ amount input 202, or by dividing the SCR efficiency value 242 by the engine-out $NO_x$ amount input 202. In determining the $NO_x$ output estimate 232 and $NH_3$ slip estimate 234, the excitation levels can be substituted for the inputs 202, 206.

The estimate correction module 260 is configured to receive and interpret the $NH_3$ reference 222, the $NO_x$ output estimate 232, the $NH_3$ slip estimate 234, the SCR efficiency value 242, and the SCR inefficiency value 252. The estimate correction module 260 is further configured to determine a corrected $NH_3$ reference 262 by feedback control to achieve a $NO_x$ output target at the tailpipe downstream of the SCR catalyst 116 in response to the $NO_x$ output estimate 232 and $NH_3$ estimate 234, with the impact of the cross-sensitivity of the second $NO_x$ sensor 136 with $NH_3$ decoupled from the $NO_x$ output estimate 232. In certain embodiments the feedback control of the correction amount of $NH_3$ reference 222 in determining corrected $NH_3$ reference 262 may be determined by the estimate correction module 260 using a cost function estimation process, such as a gradient estimation, a recursive least squares, a batched least squares, and/or the like, to minimize an estimation error. In certain further embodiments, the cost function may be minimized in real-time using fast quadratic programming methods, for example. In still other embodiments, a corrected $NH_3$ reference 262 is not determined, but rather a corrected reductant reference is determined directly without an $NH_3$ reference and the reductant dosing amount is changed directly in response to the $NO_x$ output estimate 232, the $NH_3$ slip estimate 234, the SCR efficiency value 242, and the SCR inefficiency value 252.

The dosing amount module 270 is configured to receive and interpret the corrected $NH_3$ reference 262. The dosing amount module 270 is further configured to determine a reductant dosing amount 272 (corrected reductant reference) based on the corrected $NH_3$ reference 262. In certain embodiments, the dosing amount module 270 may be further configured to receive and interpret a mid-bed $NH_3$ amount 204 and adjust the corrected $NH_3$ reference 262 and determine the reductant dosing amount 272. The reductant dosing control module is configured to receive and interpret the reductant dosing amount 272 and provide a reductant dosing command 282 based on the reductant dosing control module 280. In certain embodiments, the reductant dosing command 282 may be provided to a reductant doser, a reductant injector, and/or a reductant controller.

Figure 3:
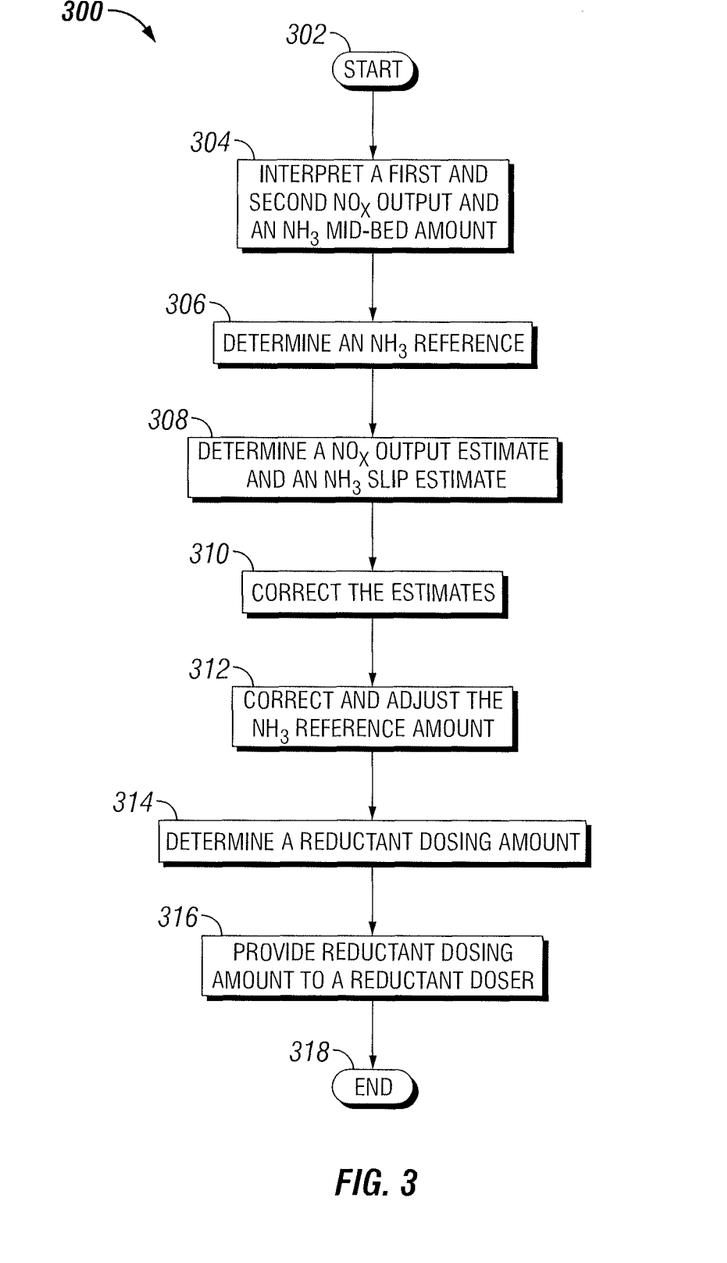
FIG. 3 is a flow diagram illustrating an exemplary procedure for dosing of a reductant into the exhaust aftertreatment system of FIG. 1.

The schematic flow diagram in FIG. 3 and related description which follows provides an illustrative embodiment of performing procedures for determining a reductant dosing amount. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

With reference to FIG. 3, there is illustrated a flow diagram of a procedure 300 for determining a dosing command for a reductant injector to provide an amount of a reductant being injected into an exhaust aftertreatment system that may be put into operation by programming into controller 130 for use in, for example, system 100. Procedure 300 begins at operation 302 in which a control routine for providing a reductant dosing amount from the reductant injector is started. Operation 302 can begin by interpreting a key-on event and/or by initiation by an operator or technician. Procedure 300 continues to operation 304, where a first $NO_x$ output amount of a first $NO_x$ sensor positioned upstream of an SCR catalyst and downstream of an engine is determined, a second $NO_x$ output amount of a second $NO_x$ sensor positioned downstream of the SCR catalyst is determined, and a mid-bed $NH_3$ amount at the SCR catalyst is determined. In another embodiment, an $NH_3$ amount at the inlet of the SCR catalyst is determined. Procedure 300 continues from operation 304 to operation 306, where an $NH_3$ reference is determined. In certain embodiments, the $NH_3$ reference may be a feedfoward $NH_3$ reference determined from an $NH_3$ table based on a mid-bed temperature of the SCR catalyst, the space velocity of the SCR catalyst, and the first $NO_x$ output amount.

From operation 306, procedure 300 continues to operation 308 to determine a $NO_x$ output estimate and an $NH_3$ slip estimate, where each of the estimates is determined in response to excitation levels from the first and second $NO_x$ sensor $NO_x$ output amounts so the cross-sensitivity of the second $NO_x$ sensor to $NH_3$ is decoupled from the second $NO_x$ sensor and the $NO_x$ output estimate. An adaptive correction to the $NH_3$ reference tables or other means that are used to determine the corrected $NH_3$ reference is determined by comparison of the $NO_x$ output estimate to the $NO_x$ output target.

An exhaust aftertreatment system conversion efficiency may be calculated by the following:

$$\theta_{SCR} = 1 - \frac{[NO_x]_{SCR\_out}}{[NO_x]_{engine\_out}} \quad \text{Equation 1}$$

wherein $\theta_{SCR}$ is the conversion efficiency of the SCR catalyst, $[NOx]_{SCR\_out}$ is an output of the second $NO_x$ sensor positioned downstream of the SCR catalyst, and $[NOx]_{engine\_out}$ is the output of the first $NO_x$ sensor upstream of the SCR catalyst.

Based on the exhaust aftertreatment system conversion efficiency, an exhaust aftertreatment system conversion inefficiency may be calculated by the following equations:

$$[NO_x]_{SCR\_out} = (1-\theta_{SCR})[NO_x]_{engine\_out} \quad \text{Equation 2}$$

and $$[NO_x]_{SCR\_out} = \eta_{SCR}[NO_x]_{engine\_out} \quad \text{Equation 3}$$

wherein $\eta_{SCR}$ is the conversion inefficiency of the exhaust aftertreatment system.

In operation, the second $NO_x$ sensor provides an output signal with a high bandwidth or excitation level due to the presence of $NO_x$, while the component of the signal for the presence of $NH_3$ has a much lower bandwidth. Accordingly, by correlating the $NO_x$ components of the signals from the first and second $NO_x$ sensors, the SCR catalyst efficiency and the SCR catalyst inefficiency can be determined from Equations 1-3, since the $NH_3$ component of the second sensor and the system dynamics in the following signal model are assumed as constants.

$$[NO_x]_{SCR\_out} = \eta_{SCR}[NO_x]_{engine\_out} + [NH_3]_{SCR\_out} + \Delta \quad \text{Equation 4}$$

In Equation 4, $[NH_3]_{SCR\_out}$ is the $NH_3$ component of the second $NO_x$ sensor and $\Delta$ is the impact of un-modeled dynamics that may be present in system 100.

In another embodiment signal model, additional sensor measurements may be provided for determining the $NO_x$ output estimate and the $NH_3$ slip estimate. In certain embodiments, an $NH_3$ sensor and/or a temperature sensor may be positioned in a mid-bed of the SCR catalyst. It is contemplated that in certain embodiments, additional sensors may be provided in various positions throughout the exhaust aftertreatment system for determining the $NO_x$ output estimate and the $NH_3$ slip estimate. In the embodiments where the $NH_3$ sensor is positioned in the mid-bed of the SCR catalyst, the following signal model may be used:

$$[NO_x]_{SCR\_out} = \eta_{SCR}[NO_x]_{engine\_out} + \eta_{NH_3}[NH_3]_{SCR\_mid\text{-}bed} + \Delta \quad \text{Equation 5}$$

wherein $\eta_{NH_3}$ is the amount of $NH_3$ converted by an SCR catalyst portion downstream of the mid-bed of the SCR catalyst and $[NH_3]_{SCR\_mid\text{-}bed}$ is the amount of $NH_3$ measured by the $NH_3$ sensor positioned in the mid-bed of the SCR catalyst.

From operation 308, procedure 300 continues to operation 310, where the $NO_x$ output estimate and/or the $NH_3$ slip estimate may be corrected to improve the accuracy of the estimates by utilizing mathematical measures of the correlations between the signals of the first and second $NO_x$ sensors to interpret the amount of excitation of the signals. In one non-limiting example, using a gradient estimation process, the following cost function may be used to minimize the estimation error:

$$J = \frac{1}{2}e_{NO_x}^2 \quad \text{Equation 6}$$

wherein $e_{NOx}$ is the estimation error between the $NO_x$ output estimate and the $NO_x$ amount measured by the second $NO_x$ sensor positioned downstream of the SCR catalyst, as shown in the following equation:

$$e_{NOx} = [NO_x]_{SCR\_out} - (\hat{\eta}[NO_x]_{engine\_out} + [NH_3]_{SCR\_est}) \quad \text{Equation 7}$$

wherein $\hat{\eta}$ is an estimate of the SCR inefficiency and $[NH_3]_{SCR\_est}$ is the $NH_3$ slip estimate. To minimize the cost function, the estimated $NO_x$ output and $NH_3$ slip are moved in the direction of the negative gradient of the cost function, which may be provided by the following equations:

$$\dot{\hat{\eta}} = -\gamma_1 * \frac{e_{NO_x}}{1 + |[NO_x(t)]_{engine_{out}}|} * \frac{\partial e_{NO_x}}{\partial \eta} \quad \text{Equation 8}$$

and $$\dot{\hat{\xi}} = -\gamma_1 * \frac{e_{NO_x}}{1 + |[NO_x(t)]_{engine_{out}}|} * \frac{\partial e_{NO_x}}{\partial \xi} \quad \text{Equation 9}$$

where $\xi = [NH_3]_{SCR\_est}$ (i.e. the $NH_3$ slip estimate). The estimation error provides a mechanism for providing corrections to the $NH_3$ reference. While the gradient estimation process is described, it is contemplated that other estimation processes, such as recursive least squares, batched least squares, and the like may be used.

From operation 310, procedure 300 continues to operation 312, where the $NH_3$ reference is corrected based on the feedback of the corrected $NO_x$ output and $NH_3$ slip estimates and the corresponding adaptive adjustments of the mid-bed reference tables used to determine the $NH_3$ reference. In other embodiments, as opposed to an $NH_3$ reference correction, an adjustment or correction of the reductant reference for dosing or ANR (ammonia to $NO_x$ ratio) could also be attempted. In certain embodiments, either, both, or neither of the $NO_x$ output and the $NH_3$ slip estimates may be corrected. In the embodiments where estimates are not corrected, the corrected $NH_3$ reference may be based on the non-corrected $NO_x$ output and $NH_3$ slip estimates.

The following control law may be utilized to adjust the mid-bed $NH_3$ references in response to the $NO_x$ output estimate and the $NH_3$ slip estimate:

$$[NH_3]_{ref\_adj} = k_{NO_x} f_{NO_x}([NO_x]_{SCR\_out}) - k_{NH_3} f_{NH_3}([NH_3]_{SCR\_mid-bed})$$ Equation 10 wherein $[NH_3]_{ref\_adj}$ is the adjusted reference, $k_{NO_x}$ and $k_{NH_3}$ are the gains on the $NO_x$ output and $NH_3$ slip estimates. In equation 10, the $NO_x$ output and $NH_3$ slip estimates are filtered using either linear or non-linear filters defined by $f_{NO_x}(\ )$ and $f_{NH_3}(\ )$, respectively.

Procedure 300 continues to operation 314, where a reductant dosing amount is determined based on the corrected $NH_3$ reference. In addition, the corrected $NH_3$ reference can be adjusted in response an $NH_3$ mid-bed amount at the SCR catalyst. Procedure 300 continues from operation 314 to operation 316, where the reductant dosing amount determined at operation 314 is provided to a reductant injector for controlling the amount of reductant injected into the exhaust stream upstream of the SCR catalyst. In certain embodiments, the reductant dosing amount may be provided to a reductant loser, reductant controller, or the like for controlling an amount of reductant injected into the exhaust stream upstream of the SCR catalyst.

Figure 4:
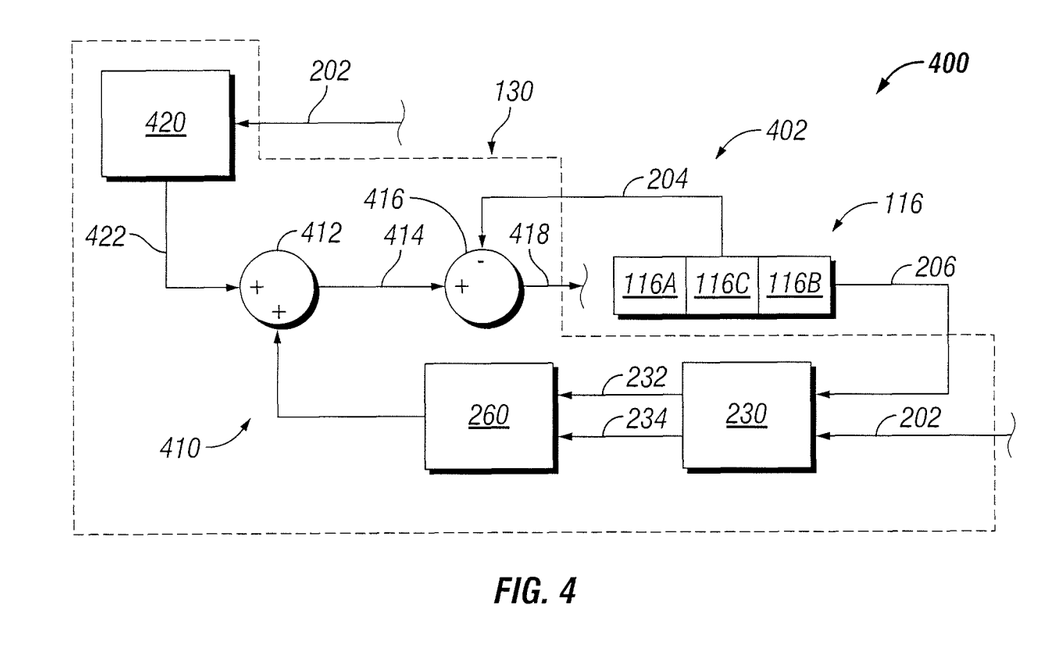
FIG. 4 is a block flow diagram of a procedure with a $NO_x$ loop for adaptively adjusting mid-bed catalyst reductant references and providing feedback control of a feedforward reductant dosing amount in response to the adapted reductant references and a mid-bed catalyst reductant concentration.

With reference to FIG. 4, there is a block flow diagram of a procedure 400 with a $NO_x$ loop for adaptively adjusting mid-bed catalyst reductant references, or SCR catalyst inlet reductant references, and providing feedback control of a feedforward reductant dosing amount in response to the adapted mid-bed catalyst reductant references and a mid-bed (or inlet) catalyst reductant concentration. In the illustrated embodiment, procedure 400 can be performed by controller 130 for providing adaptive corrections of an $NH_3$ reference for the mid-bed of an SCR catalyst, such as the SCR catalyst 116 illustrated in FIG. 1, but could also be adapted for corroding an $NH_3$ reference at a catalyst inlet. Procedure 400 includes two loops, an inner or SCR mid-bed $NH_3$ loop 402 and an outer or system output $NO_x$ loop 410. The inner loop 402 provides a faster control response than outer loop 410. The inner loop 402 includes the mid-bed $NH_3$ amount 204 determined in the mid-bed between upstream and downstream brick portions of an SCR catalyst, such as the SCR catalyst mid-bed 116C between the upstream bed 116A and the downstream bed 116B of the SCR catalyst 116 illustrated in FIG. 1.

The outer loop 410 includes the engine-out $NO_x$ amount 202 and the exhaust output $NO_x$ amount 206 that are received by the controller 130 to the estimation module 230. The estimation module 230 is configured to filter and process the signals providing the exhaust output $NO_x$ amount 206 and the engine-out $NO_x$ amount 202 to determine the $NO_x$ output estimate 232 and the $NH_3$ slip estimate 234, which are received by the estimate correction module 260. The estimate correction module 260 outputs a correction for the $NH_3$ reference table that is adapted in response to a deviation between the $NO_x$ output estimate 232 and the $NO_x$ output target.

The embodiment 400 includes a feed-forward reference generation module 420 that is configured to receive and interpret the engine-out $NO_x$ amount input 202. In certain embodiments, the feed-forward reference generation module 420 may receive various inputs in addition to and/or alternatively to the engine-out $NO_x$ amount input 202. The various inputs may include engine conditions and/or other exhaust aftertreatment system inputs such as catalyst space velocity, temperature inputs, and/or pressure inputs, for example. The feed-forward reference generation module 420 is further configured to output a feed-forward reference 422, which is corrected by any $NH_3$ reference table corrections at summer 412. The results 414 from summer 412 are provided to a comparator 416 for comparison with the mid-bed $NH_3$ amount 204. A reductant dosing amount 272 is determined based on the comparison made at the comparator 416. In certain embodiments, a gain may be determined based on the comparison made at the comparator 416.

Figure 5A:
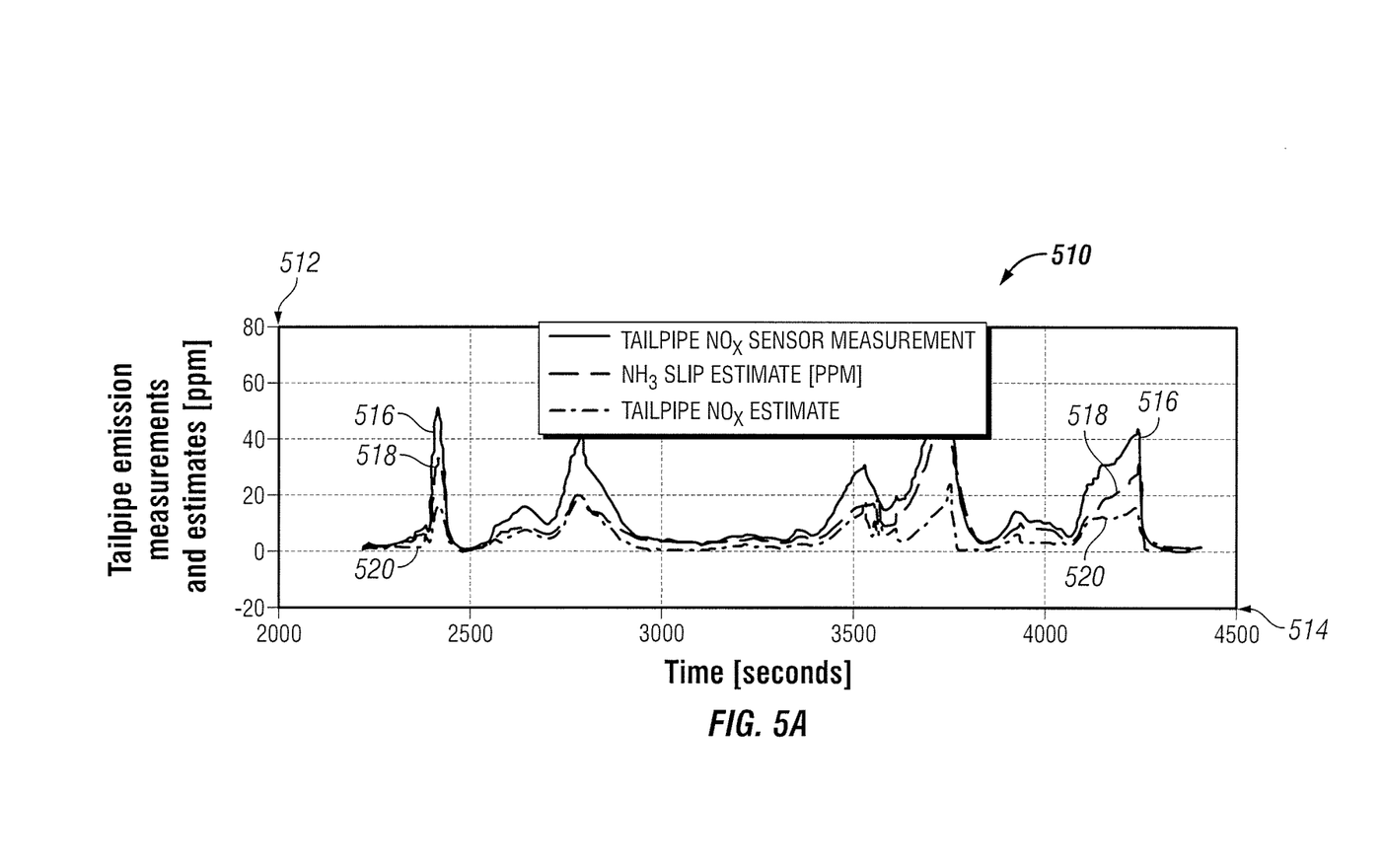
FIGS. 5A-5B are graphs of results of the $NO_x$ loop estimation scheme of FIG. 4 for a de-greened and an end-of-useful-life SCR catalyst, respectively.
Figure 5B:
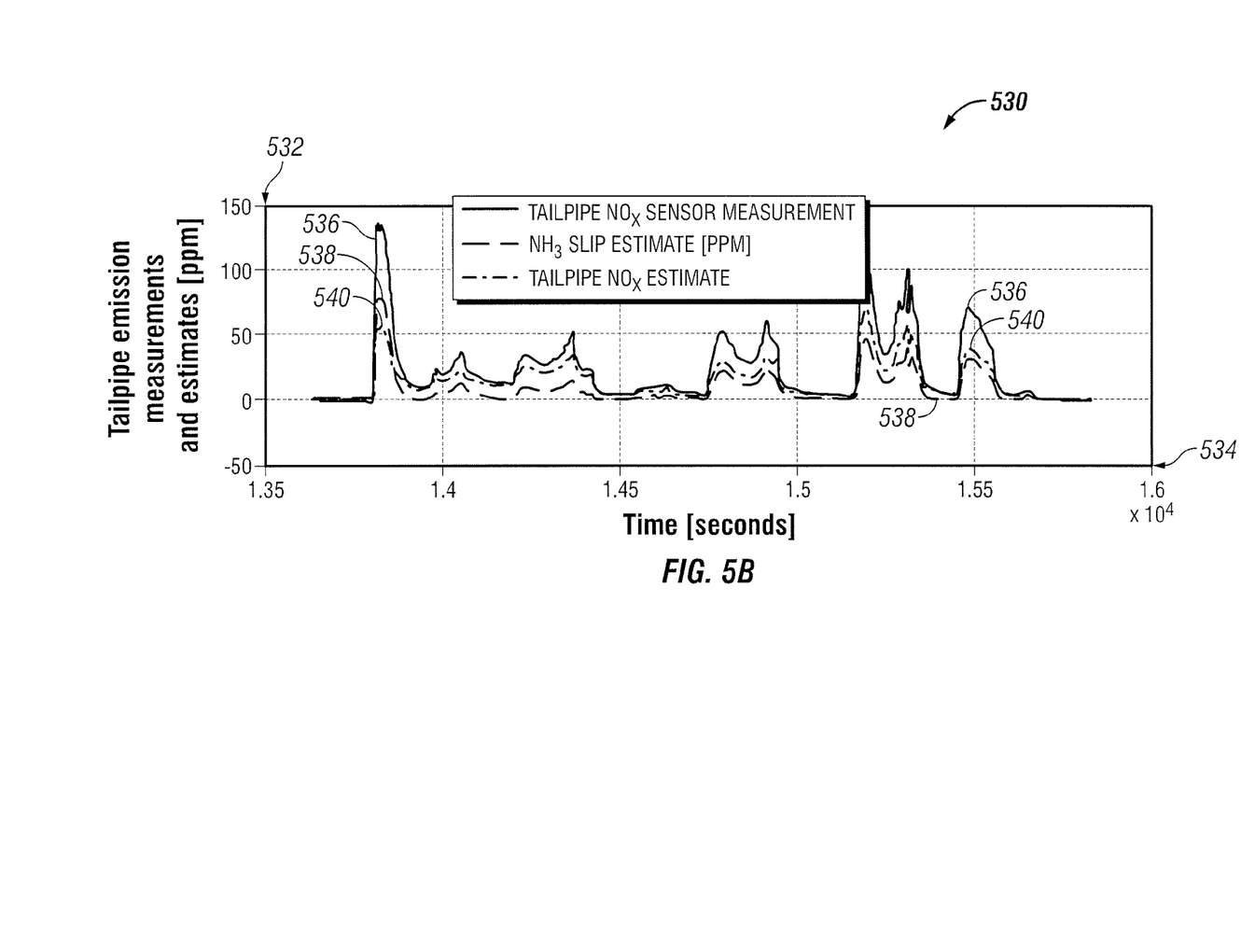

With reference to FIGS. 5A-5B, test results are illustrated for a de-greened aftertreatment system test result 510 and an end-of-useful life aftertreatment system 530, respectively. The de-greened aftertreatment test result 510 represents an aftertreatment system with a fresh SCR catalyst, DOC, and DPF, and includes a tailpipe emission in parts per million along the y-axis 512 and a time in seconds along the x-axis 514. The de-greened aftertreatment test result 510 further includes a system $NO_x$ output sensor measurement result 516, an $NH_3$ slip estimate result 518 in parts per million, and a system $NO_x$ output estimate result 520. The end-of-useful life aftertreatment system 530 represents an aged aftertreatment system with an end-of-life SCR catalyst, DOC, and DPF, and includes a tailpipe emission in parts per million along the y-axis 532 and a time in seconds along the x-axis 534. End-of-useful life aftertreatment system 530 further includes a system $NO_x$ output sensor measurement result 536, an $NH_3$ slip estimate result 538 in parts per million, and a system $NO_x$ output estimate result 538.

In the case of the de-greened aftertreatment test result 510, the system $NO_x$ output estimate 520 is low and the majority of the $NO_x$ at the output of the aftertreatment system is estimated to be $NH_3$ slip. In the case of the end-of-useful life aftertreatment system 530, the SCR catalyst efficiency is low due to aging, which results in an increase in the system output $NO_x$ estimate result 538.

Figure 6A:
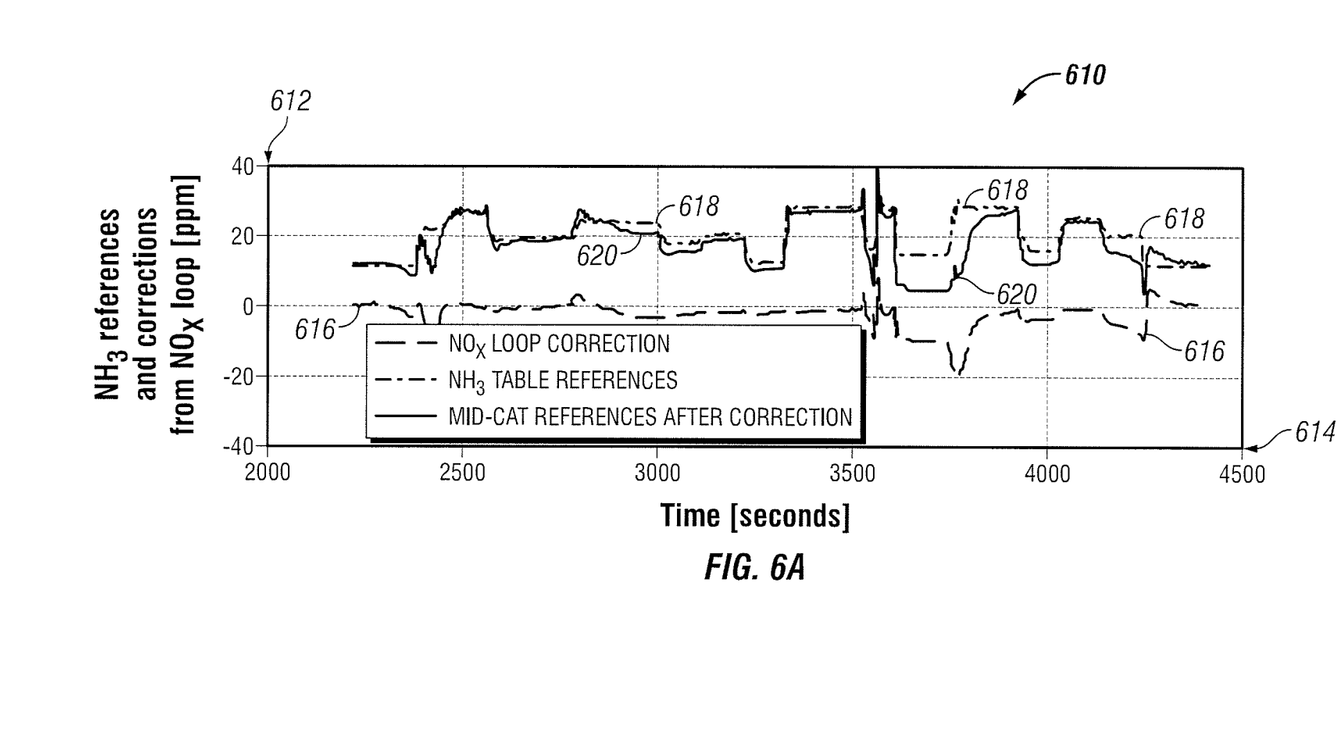
FIGS. 6A-6B are graphs of the adjustment of the mid-bed reductant references based on the feedback of the estimated $NO_x$ and $NH_3$ amounts at the outlet of the SCR catalyst for the de-greened and the end-of-useful-life SCR catalyst, respectively.
Figure 6B:
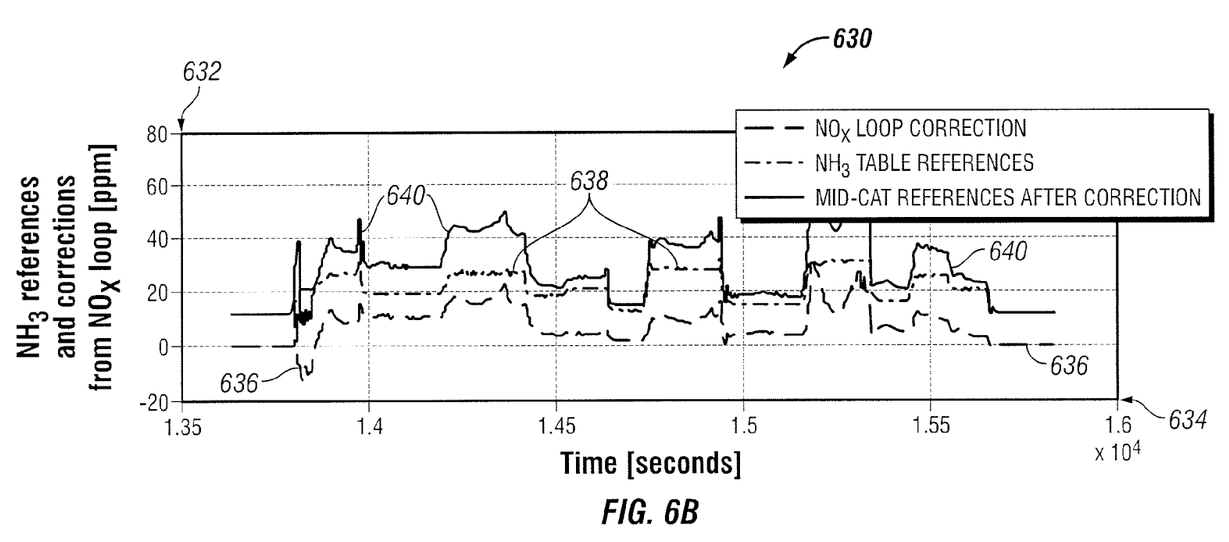

With reference to FIGS. 6A-6B, test results are illustrated for a de-greened aftertreatment system test result 610 and an end-of-useful life aftertreatment system 630 based on the feedback of the system $NO_x$ output estimate 232 and the system $NH_3$ slip estimate 234 and the resulting adjustments to $NH_3$ references to the mid-bed or inner control loop 402. The de-greened aftertreatment test result 610 represents an aftertreatment system with a fresh SCR catalyst, DOC, and DPF, and includes a tailpipe emission in parts per million along the y-axis 612 and a time in seconds along the x-axis 614. The de-greened aftertreatment test result 610 further includes a system output $NO_x$ loop correction result 616, an $NH_3$ table reference result 618, and an adjusted $NH_3$ mid-bed reference result 620. The end-of-useful life aftertreatment system 630 represents an aged aftertreatment system with an end-of-life SCR catalyst, DOC, and DPF, and includes a tailpipe emission in parts per million along the y-axis 632 and a time in seconds along the x-axis 634. The end-of-useful life aftertreatment system 630 further includes a system output $NO_x$ loop correction result 636, an $NH_3$ table references result 638, and an adjusted $NH_3$ mid-bed reference result 630. As the amount of estimated system output $NO_x$ increases, the $NH_3$ references are either increased or decreased to minimize the actual tailpipe $NO_x$.

Various aspects of the systems, apparatus, and methods are disclosed herein. As is evident from the figures and text presented above, a variety of embodiments according to the present invention are contemplated.

For example, one aspect involves a method that includes operating a system including an internal combustion engine operatively coupled to an exhaust system, the exhaust system including an exhaust aftertreatment system that includes a reductant injector operationally coupled to the exhaust system at a position upstream of an SCR catalyst, determining a first $NO_x$ output level based on a first $NO_x$ sensor positioned upstream of the SCR catalyst and a second $NO_x$ output level based on a second $NO_x$ sensor positioned downstream of the SCR catalyst, determining a $NO_x$ output estimate and an $NH_3$ slip estimate for downstream of the SCR catalyst, each based at least in part on the first and second $NO_x$ output levels and a signal model of the second $NO_x$ sensor, determining a corrected reductant reference based on the first $NO_x$ output level, the $NO_x$ output estimate, and the $NH_3$ slip estimate, and using the reductant injector to dose a reductant amount in response to the corrected reductant reference.

In one embodiment, determining the corrected reductant reference includes determining a corrected $NH_3$ reference at a mid-bed location of the SCR catalyst and the method further includes determining a dosing amount of reductant based on the corrected $NH_3$ reference and providing a dosing command to the reductant injector in response to the dosing amount. In another embodiment of the method, the method further includes determining an SCR catalyst conversion inefficiency, and wherein determining the $NO_x$ output estimate is further based on the SCR catalyst conversion inefficiency.

In one refinement of the embodiment, determining the SCR catalyst conversion inefficiency is based on a ratio of excitation levels of the first and second $NO_x$ sensors in providing the first and second $NO_x$ output levels. In another refinement, the method includes interpreting a mid-bed $NH_3$ amount based on an $NH_3$ sensor positioned at a mid-bed location of the SCR catalyst. In yet another refinement, the embodiment further includes determining an $NH_3$ conversion value based on the mid-bed $NH_3$ amount and an $NH_3$ conversion efficiency of a portion of the SCR catalyst downstream of the $NH_3$ sensor. Determining the $NO_x$ output estimate is based on the $NH_3$ conversion value and a product of the SCR catalyst conversion inefficiency and the first $NO_x$ output level. In still another refinement, determining the $NH_3$ conversion value further includes determining a temperature of the portion of the SCR catalyst. In yet still another refinement determining the dosing amount further includes adjusting the corrected $NH_3$ reference in response to the mid-bed $NH_3$ amount.

In another embodiment, determining the corrected reductant reference includes determining a corrected $NH_3$ reference at a mid-bed location of the SCR catalyst and adjusting the corrected $NH_3$ reference in response to the $NO_x$ output estimate and the $NH_3$ slip estimate. In a refinement of this embodiment, adjusting the corrected $NH_3$ reference is further based on at least one of a $NO_x$ output estimate gain and an $NH_3$ slip estimate gain In still another embodiment, the method further includes filtering at least one of the $NO_x$ output estimate and the $NH_3$ slip estimate based on a linear filter or a nonlinear filter. In yet another embodiment, determining the corrected reductant reference is further based on at least one of an upstream SCR catalyst bed temperature, an SCR catalyst midbed temperature, a downstream SCR catalyst bed temperature, and a reductant injector feedback. In yet still another embodiment, the method further includes determining a measure of correlation based on the $NO_x$ output estimate and the $NH_3$ slip estimate, and wherein determining the corrected reductant reference is further based on the measure of correlation.

In still yet another embodiment, the method further includes determining an estimation error between the $NO_x$ output estimate and the second $NO_x$ output level based on the second $NO_x$ output level less a product of a conversion inefficiency of the SCR catalyst and the first $NO_x$ output level and less the $NH_3$ slip estimate. In a refinement of the embodiment, determining the estimation error further includes at least one of a gradient estimation algorithm, a recursive least squares algorithm, and a batched least-squares algorithm.

Another aspect involves a system, including an internal combustion engine having an exhaust system for receiving an exhaust gas produced from operation of the internal combustion engine, an exhaust aftertreatment system that includes a source of a reductant for injection into the exhaust gas and a selective catalytic reduction (SCR) catalyst positioned downstream of a reductant injection location, and a plurality of $NO_x$ sensors operable to provide signals indicating a $NO_x$ amount, the plurality of $NO_x$ sensors comprising at least a first $NO_x$ sensor operable to output a first signal indicative of a first $NO_x$ amount upstream of the SCR catalyst and a second $NO_x$ sensor operable to output a second signal indicative of a second $NO_x$ amount downstream of the SCR catalyst.

The system further includes a controller connected to the plurality of $NO_x$ sensors operable to interpret the signals from the plurality of $NO_x$ sensors. The controller includes an $NH_3$ determination module structured to determine an $NH_3$ reference in response to the first $NO_x$ amount, a temperature of the SCR catalyst, and a space velocity of the SCR catalyst, an estimation module structured to determine a $NO_x$ output estimate from the SCR catalyst based on excitation levels of the first and second signals, and an $NH_3$ slip estimate from the second $NO_x$ amount and the $NO_x$ output estimate, an estimate correction module structured to determine a corrected $NH_3$ reference based on the $NO_x$ output estimate, the $NH_3$ slip estimate, and the $NH_3$ reference, a dosing amount module structured to determine a reductant dosing amount based on the corrected $NH_3$ reference, and a reductant dosing control module structured to provide a reductant dosing command in response to the reductant dosing amount.

One embodiment of the system further includes an $NH_3$ sensor positioned at a mid-bed location of the SCR catalyst operable to detect an $NH_3$ amount, and the dosing amount module is further structured to determine the reductant dosing amount based on the $NH_3$ amount.

Another embodiment of the system further includes an SCR conversion inefficiency module structured to calculate an SCR conversion inefficiency based on a ratio of a signal excitation level from the second $NO_x$ sensor to a signal excitation level of the first $NO_x$ sensor, wherein the $NO_x$ output estimate is determined as a function of the SCR conversion inefficiency and the first $NO_x$ amount. In one refinement of the embodiment, an SCR catalyst mid-bed $NH_3$ amount is determined by an SCR catalyst $NH_3$ sensor positioned between an upstream SCR catalyst bed and a downstream SCR catalyst bed, and wherein the estimation module is further structured to determine the $NO_x$ output estimate based on the SCR catalyst mid-bed $NH_3$ amount and an $NH_3$ conversion efficiency of the downstream SCR catalyst bed.

Still another embodiment further includes a reductant dosing system including a storage tank providing the source for the reductant and a reductant injector operationally coupled to the storage tank and the exhaust aftertreatment system at the reductant injection location for injecting the reductant from the storage tank into the exhaust aftertreatment system in response to the reductant dosing command.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising;
operating a system including an internal combustion engine operatively coupled to an exhaust system, the exhaust system including an exhaust aftertreatment system that includes a reductant injector operationally coupled to the exhaust system at a position upstream of an SCR catalyst;
determining a first $NO_x$ output level based on a $NO_x$ component of a first signal from a first $NO_x$ sensor positioned upstream of the SCR catalyst and a second $NO_x$ output level based on a $NO_x$ component of a second signal from a second $NO_x$ sensor positioned downstream of the SCR catalyst;
determining a $NO_x$ output estimate and an $NH_3$ slip estimate for downstream of the SCR catalyst, each based at least in part on the first and second $NO_x$ output levels and a signal model of the first $NO_x$ sensor and the second $NO_x$ sensor, wherein the signal model is based on excitation levels associated with bandwidths of the $NO_x$ components of the first and second signals from the first $NO_x$ sensor and the second $NO_x$ sensor, respectively;
determining an SCR catalyst conversion inefficiency, and wherein determining the $NO_x$ output estimate and the $NH_3$ slip estimate is further based on the SCR catalyst conversion inefficiency and determining the SCR catalyst conversion inefficiency is based on a ratio of the excitation levels of the $NO_x$ components of the first and second signals of the first and second $NO_x$ sensors in providing the first and second $NO_x$ output levels;
determining a corrected reductant reference based on the first $NO_x$ output level, the $NO_x$ output estimate, the $NH_3$ slip estimate, and the SCR catalyst conversion inefficiency; and
using the reductant injector to inject a reductant amount in response to the corrected reductant reference.

2. The method of claim 1, wherein determining the corrected reductant reference includes determining a corrected $NH_3$ reference at a mid-bed location of the SCR catalyst based on the first $NO_x$ output level, the $NO_x$ output estimate, the $NH_3$ slip estimate and the SCR catalyst conversion inefficiency.

3. The method of claim 2, further comprising: determining a dosing amount of reductant based on the corrected $NH_3$ reference; and providing a dosing command to the reductant injector in response to the dosing amount.

4. The method of claim 1, wherein determining the corrected reductant reference includes determining a corrected $NH_3$ reference at a mid-bed location of the SCR catalyst and further comprising interpreting a mid-bed $NH_3$ amount based on an $NH_3$ sensor positioned at a mid-bed location of the SCR catalyst.

5. The method of claim 4, further comprising:
determining an $NH_3$ conversion value based on the mid-bed $NH_3$ amount and an $NH_3$ conversion efficiency of a portion of the SCR catalyst downstream of the $NH_3$ sensor, and
wherein determining the $NO_x$ output estimate is based on the $NH_3$ conversion value and a product of the SCR catalyst conversion inefficiency and the first $NO_x$ output level.

6. The method of claim 5, wherein determining the $NH_3$ conversion value further includes determining a temperature of the portion of the SCR catalyst.

7. The method of claim 5, wherein determining the dosing amount further includes adjusting the corrected $NH_3$ reference in response to the mid-bed $NH_3$ amount.

8. The method of claim 1, wherein determining the corrected reductant reference includes determining a corrected $NH_3$ reference at a mid-bed location of the SCR catalyst and adjusting the corrected $NH_3$ reference in response to the $NO_x$ output estimate and the $NH_3$ slip estimate.

9. The method of claim 8, wherein, adjusting the corrected $NH_3$ reference is further based on at least one of a $NO_x$ output estimate gain and an $NH_3$ slip estimate gain.

10. The method of claim 1, further comprising filtering at least one of the $NO_x$ output estimate and the $NH_3$ slip estimate based on a linear filter or a nonlinear filter.

11. The method of claim 1, wherein determining the corrected reductant reference is further based on at least one of an upstream SCR catalyst bed temperature, an SCR catalyst midbed temperature, a downstream SCR catalyst bed temperature, and a reductant injector feedback.

12. The method of claim 1, further comprising determining a measure of correlation based on the $NO_x$ output estimate and the $NH_3$ slip estimate, and wherein determining the corrected reductant reference is further based on the measure of correlation.

13. The method of claim 1, further comprising determining an estimation error between the $NO_x$ output estimate and the second $NO_x$ output level based on the second $NO_x$ output level less a product of a conversion inefficiency of the SCR catalyst and the first $NO_x$ output level and less the $NH_3$ slip estimate.

14. The method of claim 13, wherein determining the estimation error further includes at least one of a gradient estimation algorithm, a recursive least squares algorithm, and a batched least-squares algorithm.

15. A system, comprising:
an exhaust aftertreatment system that includes a source of a reductant for injection into an exhaust gas produced by operation of an internal combustion engine and a selective catalytic reduction (SCR) catalyst positioned downstream of a reductant injection location;
a plurality of $NO_x$ sensors operable to provide signals indicating a $NO_x$ amount, the plurality of $NO_x$ sensors comprising at least a first $NO_x$ sensor operable to output a first signal having a $NO_x$ component indicative of a first $NO_x$ amount upstream of the SCR catalyst and a second $NO_x$ sensor operable to output a second signal having a $NO_x$ component indicative of a second $NO_x$ amount downstream of the SCR catalyst; and
a controller connected to the plurality of $NO_x$ Sensors operable to interpret the signals from the plurality of $NO_x$ sensors, the controller comprising:

an NH₃ determination module structured to determine an NH₃ reference in response to the first NO$_x$ amount, a temperature of the SCR catalyst, and a space velocity of the SCR catalyst;

an estimation module structured to determine a NO$_x$ output estimate from the SCR catalyst based on excitation levels associated with bandwidths of the NO$_x$ components of the of the first and second signals, and an NH₃ slip estimate from the second NO$_x$ amount and the NO$_x$ output estimate;

an SCR conversion inefficiency module structured to calculate an SCR conversion inefficiency based on a ratio of a signal excitation level of the NO$_x$ component of the second signal from the second NO$_x$ sensor to a signal excitation level of the NO$_x$ component of the first signal from the first NO$_x$ sensor, wherein the NO$_x$ output estimate is determined as a function of the SCR conversion inefficiency and the first NO$_x$ amount;

an estimate correction module structured to determine a corrected NH₃ reference based on the NO$_x$ output estimate, the NH₃ slip estimate, the NH₃ reference, and the SCR catalyst conversion inefficiency;

a dosing amount module structured to determine a reductant dosing amount based on the corrected NH₃ reference; and a reductant dosing control module structured to provide a reductant dosing command in response to the reductant dosing amount.

16. The system of claim 15, further comprising:
an NH₃ sensor positioned at a mid-bed location of the SCR catalyst operable to detect an NH₃ amount, wherein the dosing amount module is further structured to determine the reductant dosing amount based on the NH₃ amount.

17. The system of claim 15, wherein an SCR catalyst mid-bed NH₃ amount is determined by an SCR catalyst NH₃ sensor positioned between an upstream SCR catalyst bed and a downstream SCR catalyst bed, and wherein the estimation module is further structured to determine the NO$_x$ output estimate based on the SCR catalyst mid-bed NH₃ amount and an NH₃ conversion efficiency of the downstream SCR catalyst bed.

18. The system of claim 15, further comprising a reductant dosing system including a storage tank providing the source for the reductant and a reductant injector operationally coupled to the storage tank and the exhaust aftertreatment system at the reductant injection location for injecting the reductant from the storage tank into the exhaust aftertreatment system in response to the reductant dosing command.

* * * * *